US012579448B2

(12) United States Patent  
Abobakr et al.

(10) Patent No.: US 12,579,448 B2  
(45) Date of Patent: Mar. 17, 2026

(54) TECHNIQUES FOR POSITIVE ENTITY AWARE AUGMENTATION USING TWO-STAGE AUGMENTATION

(71) Applicant: Oracle International Corporation, Redwood Shores, CA (US)

(72) Inventors: Ahmed Ataallah Ataallah Abobakr, Geelong (AU); Shivashankar Subramanian, Melbourne (AU); Ying Xu, Albion (AU); Vladislav Blinov, Melbourne (AU); Umanga Bista, Southbank (AU); Tuyen Quang Pham, Springvale (AU); Thanh Long Duong, Seabrook (AU); Mark Edward Johnson, Sydney (AU); Elias Luqman Jalaluddin, Seattle, WA (US); Vanshika Sridharan, San Mateo, WA (US); Xin Xu, San Jose, CA (US); Srinivasa Phani Kumar Gadde, Fremont, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 18/163,231

(22) Filed: Feb. 1, 2023

(65) Prior Publication Data

US 2023/0419052 A1 Dec. 28, 2023

Related U.S. Application Data

(60) Provisional application No. 63/354,675, filed on Jun. 22, 2022.

(51) Int. Cl.  
*G06N 5/022* (2023.01)  
*G06F 40/247* (2020.01)  
(Continued)

(52) U.S. Cl.  
CPC ........... *G06N 5/022* (2013.01); *G06F 40/247* (2020.01); *G06F 40/295* (2020.01); *G06F 40/56* (2020.01); *G06N 5/04* (2013.01)

(58) Field of Classification Search  
CPC .......... G06N 5/022; G06N 5/04; G06N 3/045; G06N 20/00; G06F 40/247; G06F 40/295; (Continued)

(56) References Cited

U.S. PATENT DOCUMENTS 8,321,220 B1 * 11/2012 Chotimongkol ....... G09B 19/04  
704/277  
11,158,311 B1 10/2021 Zhang  
(Continued)

FOREIGN PATENT DOCUMENTS

CN 107515857 A 12/2017  
EP 3183728 A1 6/2017  
(Continued)

OTHER PUBLICATIONS

Issifu et al., "A Simple Data Augmentation Method to Improve the Performance of Named Entity Recognition Models in Medical Domain" 2021 6th International Conference on Computer Science and Engineering (Year: 2021).*  
(Continued)

*Primary Examiner* — Darioush Agahi  
(74) *Attorney, Agent, or Firm* — Kilpatrick Townsend & Stockton LLP

(57) ABSTRACT

Novel techniques are described for positive entity-aware augmentation using a two-stage augmentation to improve the stability of the model to entity value changes for intent prediction. In one particular aspect, a method is provided that includes accessing a first set of training data for an intent prediction model, the first set of training data comprising utterances and intent labels; applying one or more positive  
(Continued)

100 data augmentation techniques to the first set of training data, depending on the tuning requirements for hyper-parameters, to result in a second set of training data, where the positive data augmentation techniques comprise Entity-Aware ("EA") technique and a two-stage augmentation technique; combining the first set of training data and the second set of training data to generate expanded training data; and training the intent prediction model using the expanded training data.

20 Claims, 8 Drawing Sheets

(51) Int. Cl.
  *G06F 40/295* (2020.01)
  *G06F 40/56* (2020.01)
  *G06N 5/04* (2023.01)

(58) Field of Classification Search
  CPC ...... G06F 40/56; G06F 40/216; G06F 40/284;
  G06F 40/30
  See application file for complete search history.

(56) References Cited

U.S. PATENT DOCUMENTS

| | | | |
|---|---|---|---|
| 11,281,857 | B1 | 3/2022 | Craft et al. |
| 11,538,457 | B2 | 12/2022 | Jalaluddin et al. |
| 2016/0055240 | A1 | 2/2016 | Tur et al. |
| 2016/0350288 | A1 | 12/2016 | Wick et al. |
| 2017/0069310 | A1 | 3/2017 | Hakkani-Tur et al. |
| 2018/0314689 | A1 | 11/2018 | Wang et al. |
| 2018/0358000 | A1 | 12/2018 | Amid et al. |
| 2018/0358001 | A1 | 12/2018 | Amid et al. |
| 2019/0180196 | A1 | 6/2019 | Terry et al. |
| 2020/0226212 | A1 | 7/2020 | Tan et al. |
| 2020/0257857 | A1 | 8/2020 | Peper et al. |
| 2020/0320351 | A1 | 10/2020 | Nikolenko et al. |
| 2022/0129644 | A1* | 4/2022 | Kang ............... G06F 18/2193 |
| 2022/0171930 | A1 | 6/2022 | Jalaluddin et al. |
| 2022/0222441 | A1 | 7/2022 | Liu et al. |
| 2022/0366893 | A1 | 11/2022 | Qu et al. |
| 2023/0103728 | A1* | 4/2023 | Liu ..................... G06F 40/30 704/9 |
| 2024/0062264 | A1* | 2/2024 | Trikha ............ G06Q 30/0625 |
| 2024/0096155 | A1* | 3/2024 | Sachdeva ............. G07C 9/28 |

FOREIGN PATENT DOCUMENTS

| | | | |
|---|---|---|---|
| WO | 2016028946 | A1 | 2/2016 |
| WO | 2016055240 | A1 | 4/2016 |

OTHER PUBLICATIONS

Sosuke Kobayashi:"Contextual augmentation: Data augmentation by words with paradigmatic relations." augarXiv:1805.06201v1 [cs.CL] May 16, 2018 (Year: 2018).*

Botframework—Training None Intent in LUIS—Stack Overflow, Available Online at: https://stackoverflow.com/questions/46116260/training-none-intent-in-luis, Sep. 8, 2017, pp. 1-2.

U.S. Appl. No. 17/016,117, First Action Interview Pilot Program Pre-Interview Communication mailed on Jun. 9, 2022, 4 pages.

U.S. Appl. No. 17/016,117, Notice of Allowance mailed on Aug. 10, 2022, 13 pages.

U.S. Appl. No. 17/016,122, Final Office Action mailed on Sep. 30, 2022, 47 pages.

U.S. Appl. No. 17/016,122, Non-Final Office Action mailed on Apr. 26, 2022, 21 pages.

U.S. Appl. No. 17/345,288, Non-Final Office Action mailed on Dec. 22, 2022, 12 pages.

Abulaish et al., A Text Data Augmentation Approach for Improving the Performance of CNN, 2019 11th International Conference on Communication Systems & Networks (COMSNETS), Jan. 7, 2019, 6 pages.

Anaby-Tavor et al., Do Not Have Enough Data? Deep Learning to the Rescue!, Available Online at: arXiv:1911.03118v2, Cornell University Library, Nov. 27, 2019, 9 pages.

Bird et al., Chatbot Interaction with Artificial Intelligence: Human Data Augmentation with TS and Language Transformer Ensemble for Text Classification, Available Online at: arXiv:2010.05990v2, Cornell University Library, Oct. 23, 2020, 18 pages.

Coulombe, Text Data Augmentation Made Simple by Leveraging NLP Cloud APIs, Olin Library Cornell University, Ithaca, Available on internet at: https://arxiv.org/ftp/arxiv/papers/1812/1812.04718.pdf, Dec. 5, 2018, 33 pages.

Dai et al., An Analysis of Simple Data Augmentation for Named Entity Recognition, Arxiv.Org, Cornell University Library, 201, Oct. 22, 2020, 7 pages.

Jalalvand et al., Automatic Data Expansion for Customer-Care Spoken Language Understanding, Available Online at: arXiv:1810.00670v1, Cornell University Library, Sep. 27, 2018, 10 pages.

Jurafsky et al., Regular Expressions, Text Normalization, Edit Distance, Speech and Language Processing, Available Online at: https://web.archive.org/web/20180219015352if_/http://web.stanford.edu:80/~jurafsky/slp3/2.pdf, Aug. 7, 2017, 25 pages.

Li et al., An Unsupervised Learning Approach for NER Based on Online Encyclopedia, Advances in Databases And Information Systems; [Lecture Notes In Computer Science], Springer International Publishing, Jul. 18, 2019, 16 pages.

Mintz et al., "Distant Supervision for Relation Extraction Without Labeled Data", Proceedings of the Joint Conference of the 47th Annual Meeting of the ACL and the 4th International Joint Conference on Natural Language Processing of the AFNLP, vol. 2, Aug. 2, 2009, pp. 1003-1011.

International Application No. PCT/US2020/050342, International Search Report and Written Opinion mailed on Dec. 14, 2020, 9 pages.

International Application No. PCT/US2020/05040, International Preliminary Report on Patentability mailed on Mar. 31, 2022, 8 pages.

International Application No. PCT/US2020/050407, International Search Report and Written Opinion mailed on Dec. 14, 2020, 10 pages.

International Application No. PCT/US2021/036939, International Search Report and Written Opinion mailed on Sep. 24, 2021, 11 pages.

International Application No. PCT/US2021/060953, International Search Report and Written Opinion mailed on Mar. 15, 2022, 14 pages.

International Application No. PCT/US2021/060956, International Search Report and the Written Opinion mailed on May 24, 2022, 9 pages.

Wei et al., EDA: Easy Data Augmentation Techniques for Boosting performance on Text Classification Tasks, Proceedings of the 2019 Conference on Empirical Methods in Natural Language Processing and the 9th International Joint Conference on Natural Language Processing, Nov. 3-7, 2019, pp. 6382-6388.

Xie et al., Data Noising as Smoothing in Neural Network Language Models, 5th International Conference on Learning Representations, Mar. 7, 2017, 12 pages.

International Application No. PCT/US2023/018351, International Search Report and Written Opinion mailed on Jul. 18, 2023, 10 pages.

Issifu et al., A Simple Data Augmentation Method to Improve the Performance of Named Entity Recognition Models in Medical Domain, IEEE Xplore, 6th International Conference on Computer Science and Engineering (UBMK), retrieved from https://www.researchgate.net/publication/355226547, Sep. 2021, 8 pages.

U.S. Appl. No. 18/163,230, Non-Final Office Action mailed on Feb. 21, 2025, 44 pages.

(56) References Cited

OTHER PUBLICATIONS

Kang et al., "UMLS-Based Data Augmentation for Natural Language Processing of Clinical Research Literature", Journal of the American Medical Informatics Association, vol. 28, No. 4, Mar. 18, 2021, pp. 812-823.

Application No. PCT/US2023/018351, International Preliminary Report on Patentability mailed On Jan. 2, 2025, 7 pages.

Sinha et al., "Negative Data Augmentation", Cornell University, Available Online at: https://arxiv.org/pdf/2102.05113v1.pdf, Feb. 9, 2021, 17 pages.

* cited by examiner

TECHNIQUES FOR POSITIVE ENTITY AWARE AUGMENTATION USING TWO-STAGE AUGMENTATION

CROSS-REFERENCES TO RELATED APPLICATIONS

This application is a non-provisional of and claims the benefit and priority under 35 U.S.C. 119 (e) U.S. Provisional Application No. 63/354,675, filed on Jun. 22, 2022, which is incorporated herein by reference in its entirety for all purposes. This application is related to U.S. Non-Provisional application Ser. No. 18/163,230, filed on Feb. 1, 2023, entitled "TECHNIQUES FOR TWO-STAGE ENTITY-AWARE DATA AUGMENTATION" and U.S. Non-Provisional application Ser. No. 18/163,235, filed on Feb. 1, 2023, entitled "TECHNIQUES FOR NEGATIVE ENTITY AWARE AUGMENTATION," the disclosures of which are incorporated by reference in their entirety for all purposes.

FIELD

The present disclosure relates generally to machine learning techniques, and more particularly, to techniques for data augmentation using a combination of positive augmentation with post-processing and negative augmentation to improve robustness of intent prediction model to different entity values.

BACKGROUND

Artificial intelligence/machine learning (AI/ML) has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

BRIEF SUMMARY

Machine learning techniques are disclosed for data augmentation using a combination of positive augmentation with post-processing and negative augmentation to improve robustness of intent prediction model to different entity values.

In various embodiments, a computer implemented method comprises applying a combination of entity-aware data augmentation techniques to a first set of training data to result in a second set of training data, where the entity-aware data augmentation techniques comprise positive augmentation techniques, a two-stage augmentation technique that post-processes an augmented data, and negative augmentation techniques; and training an intent prediction model using the combined first set of training data and the second set of training data.

In various embodiments, a computer implemented method comprises accessing a first set of training data for an intent prediction model, the first set of training data comprising utterances and intent labels; extracting named entities from the first set of training data using a trained NER model; applying one or more positive data augmentation techniques to the first set of training data, depending on the tuning requirements for hyper-parameters, to result in a second set of training data, where the positive data augmentation techniques comprise Entity-Aware ("EA") technique and a two-stage augmentation technique; combining the first set of training data and the second set of training data to generate expanded training data; training the intent prediction model using the expanded training data; and deploying the trained intent prediction model.

In yet another embodiment, the EA technique comprises replacing at least one or more entity values of the named entities within the first set of training data with random values sampled from an in-domain repository.

In yet another embodiment, the method further comprises an augmentation rate configured to perform multiple operations of the EA technique.

In yet another embodiment, the two-stage augmentation technique comprises a first-stage augmentation and a second-stage augmentation, and the first-stage augmentation is performed at the same time as the EA technique.

In yet another embodiment, the first-stage augmentation of the two-stage augmentation technique comprises: randomly replacing a portion of the first set of training data with synonyms; or randomly deleting one or more named entities within the first set of training data.

In yet another embodiment, first-stage augmentation of the two-stage augmentation technique comprises: randomly inserting a synonym in a random position in the first set of training data; or randomly swapping positions of two named entities within the first set of training data.

In yet another embodiment, the first-stage augmentation of the two-stage augmentation technique comprises randomly adding in-domain context around entity values within the first set of training data.

In yet another embodiment, the second-stage augmentation of the two-stage augmentation technique comprises replacing at least one or more entity values of the named entities within the result of the first-stage augmentation with random values of same entity type.

In various embodiments, a system is provided that includes one or more data processors and a non-transitory computer readable medium containing instructions which, when executed on the one or more data processors, cause the one or more data processors to perform part or all of one or more methods disclosed herein.

In various embodiments, a computer-program product is provided that is tangibly embodied in a non-transitory machine-readable medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
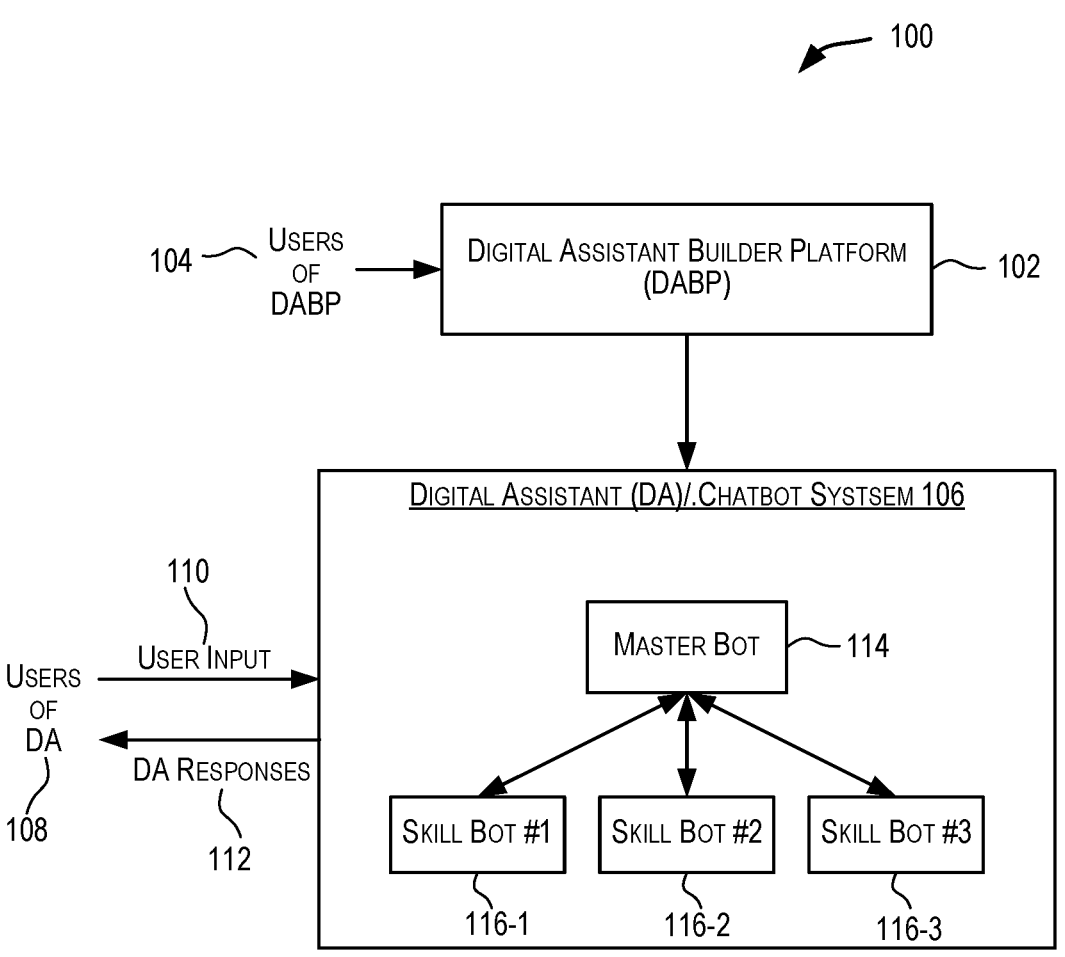
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

AI/ML has many applications. A digital assistant, as an exemplary application, is an artificially intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting timecards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various bots. The channels may also support user agent escalation, event-initiated conversations, and testing.

Intents allow the chatbot to understand what the user wants the chatbot to do. Intents refer to the user's intention communicated to the chatbot via user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing but are expressed differently. Collectively, the intents, and the utterances that belong to them, make up a training corpus for the chatbot. By training an algorithm with the corpus, a customer turns that algorithm into a model that serves as a reference tool for resolving end user input(s) to a single intent. A customer can improve the acuity of the chatbot's cognition through rounds of intent testing and intent training.

There are some challenges in training machine learning (ML) models. One issue is the robustness to the entity values (or entity sensitivity) because the model produces different outputs with different confidence levels when the entity values change. Thus, with input utterances that only differ by entity values, resulting model predictions can identify different classes and sometimes different prediction confidence levels. For example, when an input utterance "Give Peter a raise" changes to "Give James a raise," the model may output a different class or a different confidence level. Another issue is an ML model may use entity values as shortcuts for prediction such that there is an intent-entity association between entity values and its intent output class. For example, if an input utterance contains a name and a money value, the ML model may learn and predict an intent about sending money, which could cause the model to erroneously predict an intent about sending money for the following utterance: "Did Katy Smith charge $20 to my account?". As a further example, if an input utterance contains a name and a date, the model may learn and predict an intent about creating a meeting record, which could cause the model to erroneously predict an intent about creating a meeting record for the following utterance: "Is the birthday of Katy Smith on December 19?".

Accordingly, different approaches are needed to address the challenge of model prediction's sensitivity to entity value changes. The entity-aware data augmentation techniques described in this present disclosure provide advancements and improvements to training ML models to focus more on the overall context rather than the individual entity value changes of the input utterance by utilizing a combination of various positive, negative and multi-stage augmentations to entity values in training data. In various embodiments, a method is provided that includes obtaining a first set of training data for an intent prediction model, where the first set of training data includes utterances and intent labels; extracting named entities from the first set of training data using a trained NER model; applying one or more data augmentation techniques to the first set of training data, depending on tuning requirements for hyper-parameters, to result in a second set of training data; applying an additional augmentation technique to augment the second set of training data to create a post-processed augmented training data, where the additional augmentation technique includes replacing at least one or more entity values of the named entities within the second set of training data with random values of same entity type; combining the first set of training data and the post-processed augmented training data to generate expanded training data to train the intent prediction model; and deploying the trained intent prediction model to a Chatbot system.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bots to communicate with end users through a messaging application. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, the bot may be associated with a Uniform Resource Identifier (URI). The URI may identify the bot using a string of characters. The URI may be used as a webhook for one or more messaging application systems. The URI may include, for example, a Uniform Resource Locator (URL) or a Uniform Resource Name (URN). The bot may be designed to receive a message (e.g., a hypertext transfer protocol (HTTP) post call message) from a messaging application system. The HTTP post call message may be directed to the URI from the messaging application system. In some examples, the message may be different from a HTTP post call message. For example, the bot may receive a message from a Short Message Service (SMS). While discussion herein refers to communications that the bot receives as a message, it should be understood that the message may be an HTTP post call message, a SMS message, or any other type of communication between two systems.

End users interact with the bot through conversational interactions (sometimes referred to as a conversational user interface (UI)), just as end users interact with other people. In some cases, the conversational interactions may include the end user saying "Hello" to the bot and the bot responding with a "Hi" and asking the end user how it can help. End users also interact with the bot through other types of interactions, such as transactional interactions (e.g., with a banking bot that is at least trained to transfer money from one account to another), informational interactions (e.g., with a human resources bot that is at least trained check the remaining vacation hours the user has), and/or retail interactions (e.g., with a retail bot that is at least trained for discussing returning purchased goods or seeking technical support).

In some examples, the bot may intelligently handle end user interactions without intervention by an administrator or developer of the bot. For example, an end user may send one or more messages to the bot in order to achieve a desired goal. A message may include certain content, such as text, emojis, audio, image, video, or other method of conveying a message. In some examples, the bot may automatically convert content into a standardized form and generate a natural language response. The bot may also automatically prompt the end user for additional input parameters or request other additional information. In some examples, the bot may also initiate communication with the end user, rather than passively responding to end user utterances.

A conversation with a bot may follow a specific conversation flow including multiple states. The flow may define what would happen next based on an input. In some examples, a state machine that includes user defined states (e.g., end user intents) and actions to take in the states or from state to state may be used to implement the bot. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage the bot in a conversation to order pizza, where the user's intent would be represented through the utterance "order pizza." A user intent can be directed to a particular task that the user wishes the bot to perform on behalf of the user. Therefore, utterances reflecting the user's intent can be phrased as questions, commands, requests, and the like.

In the context of the configuration of the bot, the term "intent" is also used herein to refer to configuration information for mapping a user's utterance to a specific task/action or category of task/action that the bot can perform. In order to distinguish between the intent of an utterance (i.e., a user intent) and the intent of the bot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the bot to enable the intent classifier to subsequently determine whether an input utterance from a user matches the order pizza intent. Bot intents may be associated with one or more dialog flows for starting a conversation with the user and in a certain state. For example, the first message for the order pizza intent could be the question "What kind of pizza would you like?" In addition to associated utterances, bot intents may further comprise named entities that relate to the intent. For example, the order pizza intent could include variables or parameters used to perform the task of ordering pizza (e.g., topping 1, topping 2, pizza type, pizza size, pizza quantity, and the like). The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users 104 of DABP 102 to create and deploy digital assistants or chatbot systems. DABP 102 can be used to create one or more digital assistants (or DAs) or chatbot systems. For example, as shown in FIG. 1, users 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is a tool that helps users of the digital assistant accomplish various tasks through natural language conversations. A digital assistant can be implemented using software only (e.g., the digital assistant is a digital tool implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some examples, a user utterance 110 can be in audio input or speech form, such as when a user says or speaks something that is provided as input to digital assistant 106. The utterances are typically in a language spoken by the user. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some examples, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user of digital assistant 106 or are the results of conversion of input speech utterances to text form. This however is not intended to be limiting or restrictive in any manner.

For example, a user input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some examples, this processing involves a series or pipeline of processing steps including, for example, understanding the meaning of the input utterance, determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related tasks such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain examples, the NLU processing is performed by digital assistant 106 itself. In some other examples, digital assistant 106 may use other resources to perform portions of the NLU processing. For example, the syntax and structure of an input utterance sentence may be identified by processing the sentence using a parser, a part-of-speech tagger, and/or a NER. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain examples, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, 116-3, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain examples, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, etc. This way the end user or consumer of the digital assistant need only know how to access the digital assistant through the common master bot interface and behind the scenes multiple skill bots are provided for handling the user request.

In certain examples, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain examples, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain examples, at a high level, creating or customizing a skill bot involves the following steps:

(1) Configuring settings for a new skill bot (2) Configuring one or more intents for the skill bot (3) Configuring one or more entities for one or more intents (4) Training the skill bot (5) Creating a dialog flow for the skill bot (6) Adding custom components to the skill bot as needed (7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain examples, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot— A skill bot is configured to receive user input in the form of utterances parse or otherwise process the received input and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain examples, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain examples, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain examples, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section— A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill, they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot— DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
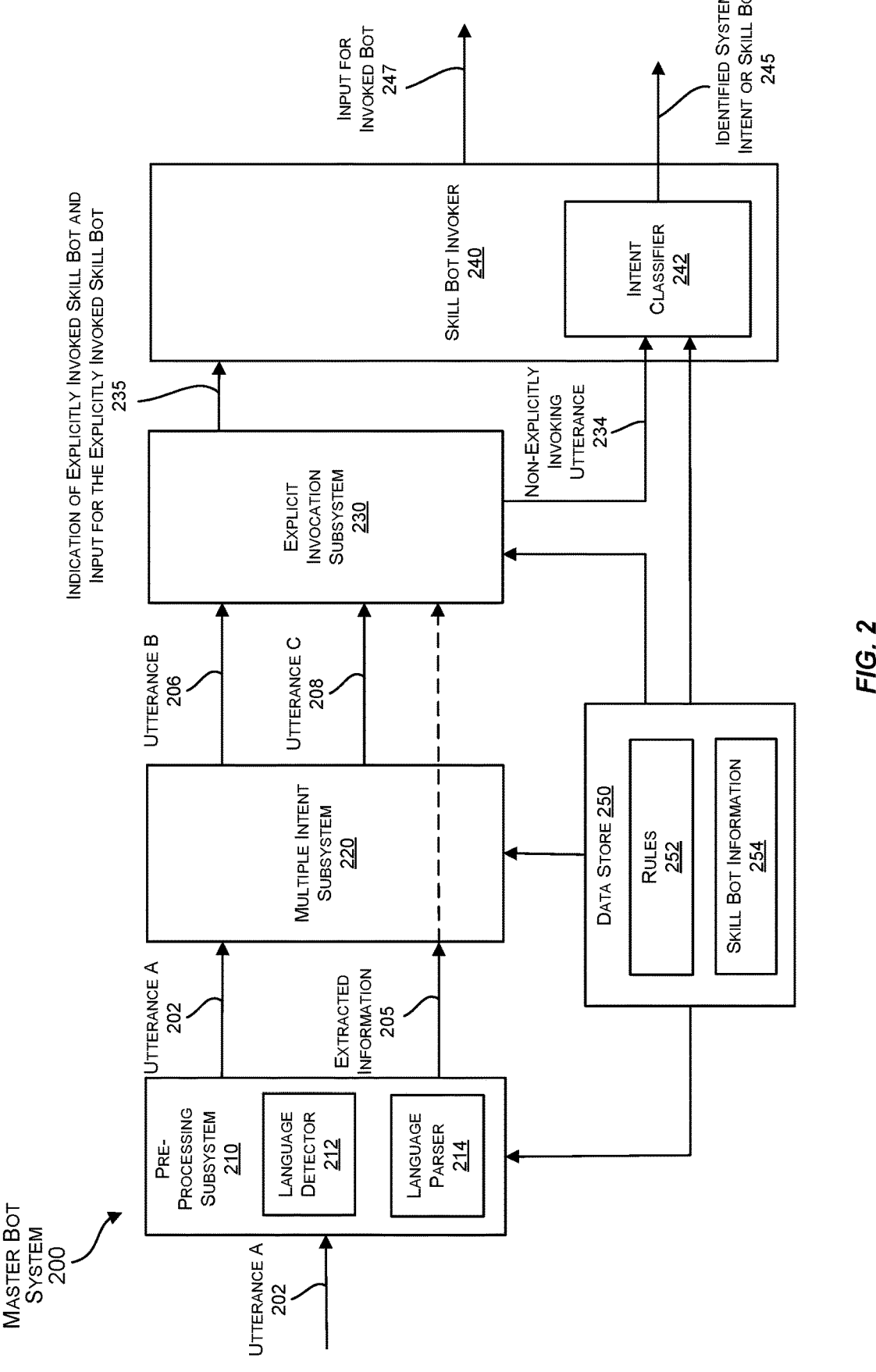
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
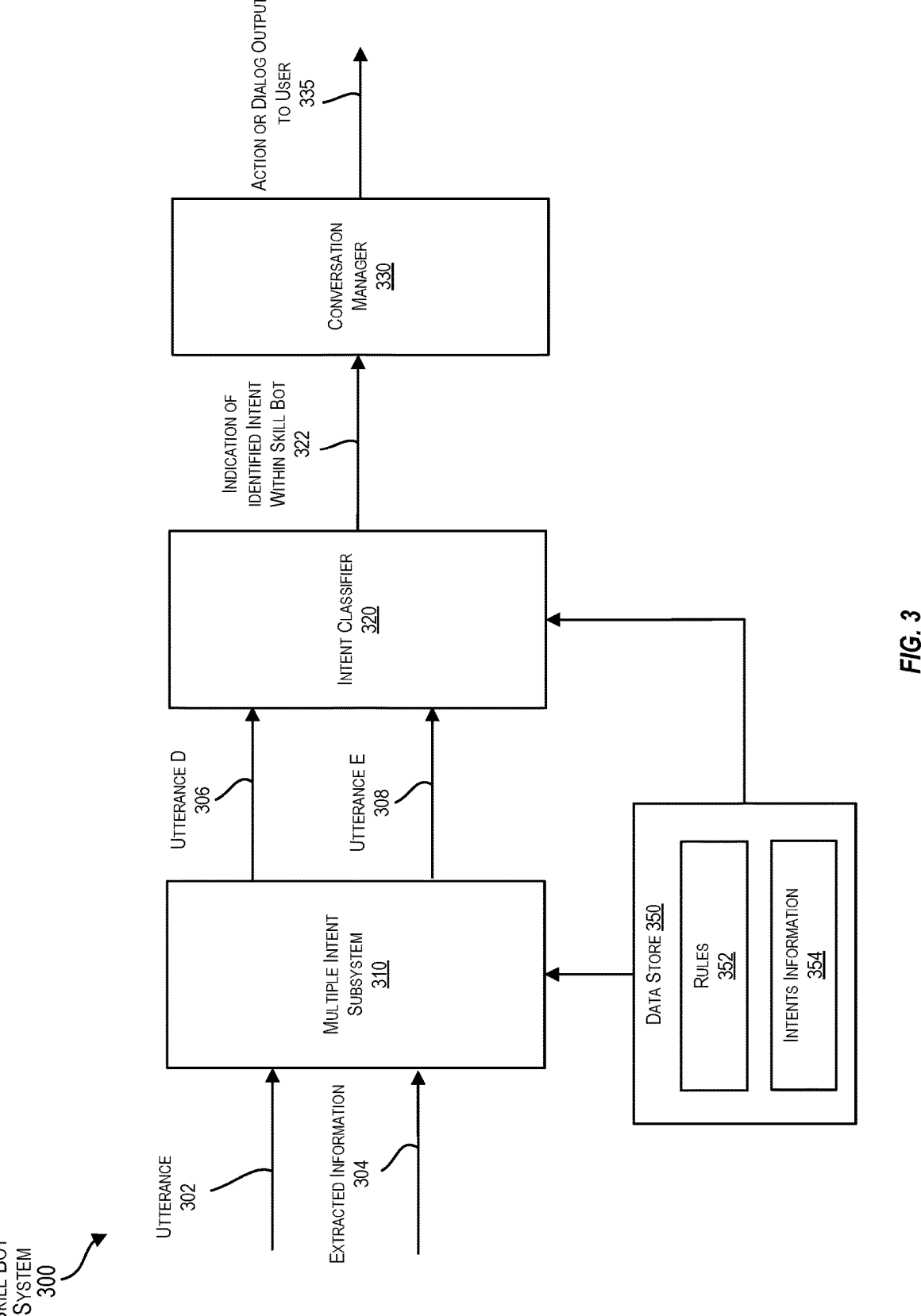
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent (e.g., "Place a pizza order using payment account X, then place a pizza order using payment account Y").

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Figure 4:
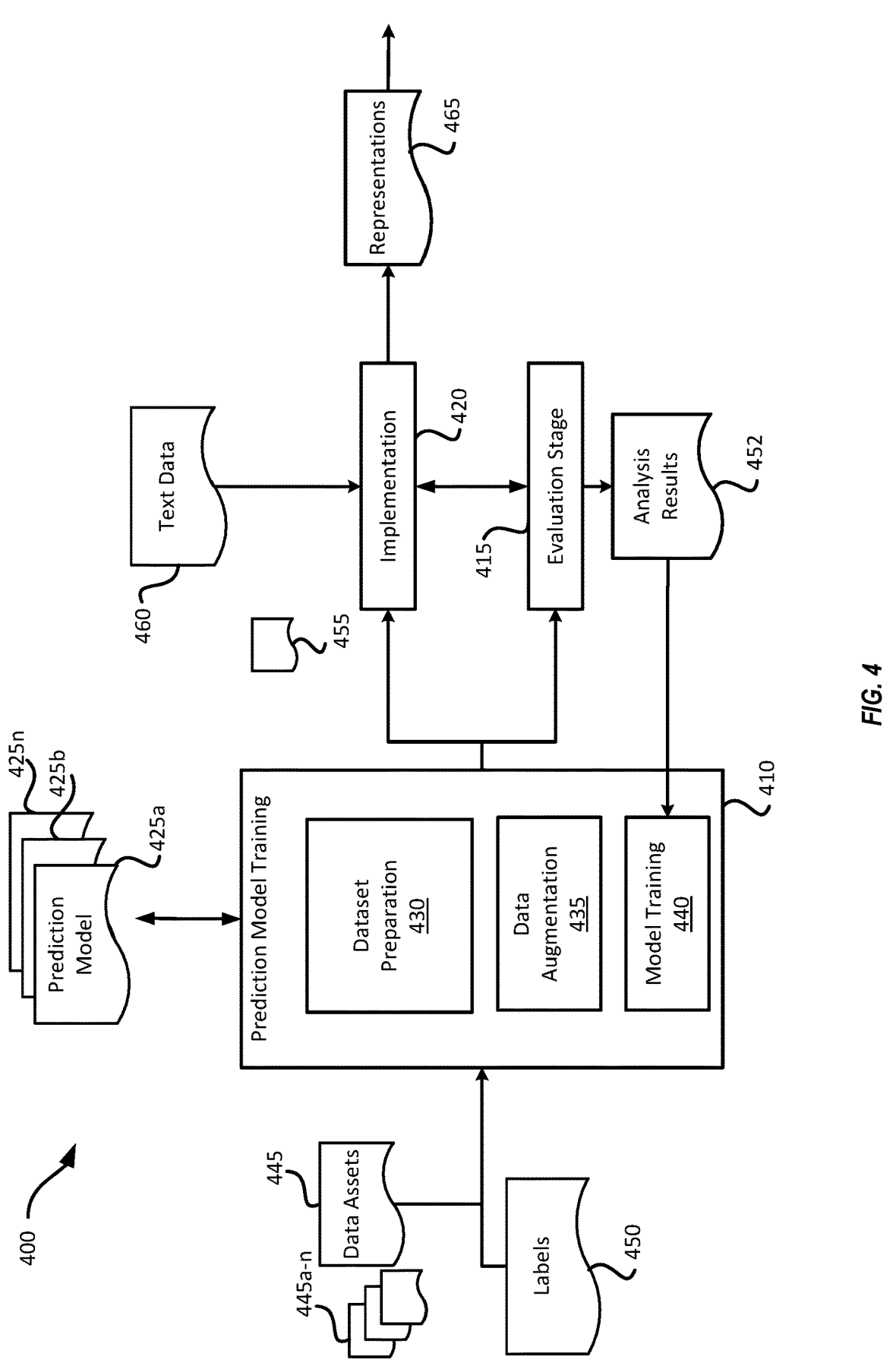
FIG. 4 is a simplified block diagram of a chatbot training and deployment system in accordance with various embodiments

FIG. 4 shows a block diagram illustrating aspects of a chatbot system 400 configured to train one or more models based on text data. As shown in FIG. 4, the entity recognition performed by the chatbot system 400 in this example includes various stages: a prediction model training stage 410 to build and train models, an evaluation stage 415 to evaluate performance of trained models, and an implementation stage 420 for implementing one or more chatbots. The prediction model training stage 410 builds and trains one or more prediction models 425a-425n ('n' represents any natural number) to be used by the other stages (which may be referred to herein individually as a prediction model 425 or collectively as the prediction models 425). For example, the prediction models 425 can include a model for encoding utterances, another model for determining a likelihood that an utterance is representative of a task that a particular skill bot is configured to perform, another model for predicting an intent from an utterance for a first type of skill bot, and another model for predicting an intent from an utterance for a second type of skill bot. Still other types of prediction models may be implemented in other examples according to this disclosure.

A prediction model 425 can be a machine-learning ("ML") model, such as a convolutional neural network ("CNN"), e.g., an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A prediction model 425 can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The chatbot system 400 may employ the same type of prediction model or different types of prediction models for recognizing one or more entities in an utterance, determining a likelihood that an utterance is representative of a task that a particular skill bot is configured to perform, predicting an intent from an utterance for a first type of skill bot, and predicting an intent from an utterance for a second type of skill bot. Still other types of prediction models may be implemented in other examples according to this disclosure.

To train the various prediction models 425, the training stage 410 is comprised of three main components: dataset preparation 430, data augmentation 435, and model training 440. The dataset preparation 430 includes the process of loading data assets 445, splitting the data assets 445 into training and validation sets 445 a-n so that the system can train and test the prediction models 425, and performing basic pre-processing. The splitting the data assets 445 into training and validation sets 445 a-n may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting.

The training data 445a may include at least a subset of utterances from example utterances associated with one or more skill bots. As indicated above, an utterance can be provided in various ways including audio or text. The utterance can be a sentence fragment, a complete sentence, multiple sentences, and the like. For example, if the utterance is provided as audio, the data preparation 430 may convert the audio to text using a speech-to-text converter (not shown) that inserts punctuation marks into the resulting text, e.g., commas, semicolons, periods, etc. In some instances, the example utterances are provided by a client or customer. In other instances, the example utterances are automatically generated from prior libraries of utterances (e.g., identifying utterances from a library that are specific to a skill that a chatbot is designated to learn). The training data 445a for a prediction model 425 can include input text or audio (or input features of text or audio frames) and labels 450 corresponding to the input text or audio (or input features), e.g., as a matrix or table of values. For example, for each training utterance, an indication of the correct entities, intents, and classification thereof to be inferred by the prediction model 425 may be provided as ground truth information in labels 450. The behavior of the prediction model 425 can then be adapted (e.g., through back-propagation) to minimize the difference between the generated inferences for various entities and the ground truth information.

The data augmentation 435 includes the process of using the training data 445a as anchor utterances to generate positive and negative utterances having diverse sets of context and entity values in any number of languages and formats to make the predictive model 425 provide improved representations of the utterances. By using the training data 445a as anchor utterances to generate positive and negative utterances having diverse sets of context and entity values in any number of languages and formats, the predictive model 425 becomes better at providing representations of utterances. The generation comprises multiple operations that in general include: (i) using the utterances of the training data as anchor utterances and generating positive utterances using translation, perturbation, and/or augmentation operations; and (ii) using the anchor utterances and generating negative utterances using augmentation and/or sampling operations. Together the anchor utterances, the positive utterances, and the negative utterances are used in an unsupervised contrastive loss framework to distill knowledge from a pre-trained sentence encoding model to learn a new sentence encoding model that performs well in intent classification tasks.

The training process for model 425 includes selecting hyperparameters for the model 425 and performing iterative operations of inputting utterances from the subset of augmented training data 445a into the model 425 to find a set of model parameters (e.g., weights and/or biases) that maximizes or minimizes an objective function, e.g., minimizes a loss function, for the model 425. The hyperparameters are settings that can be tuned or optimized to control the behavior of the model 425. Most models explicitly define hyperparameters that control different aspects of the models such as memory or cost of execution. However, additional hyperparameters may be defined to adapt a model to a specific scenario. For example, the hyperparameters may include the number of hidden units or layers of a model, the learning rate of a model, the convolution kernel width, or the number of parameters for a model. Each iteration of training can involve finding a set of model parameters for the model 425 (configured with a defined set of hyperparameters) so that the value of the objective function using the set of model parameters is smaller than the value of the objective function using a different set of model parameters in a previous iteration. The objective function can be constructed to measure the difference between the outputs inferred using the model 425 and the ground truth annotated to the subset of augmented training data 445a using the labels 150.

Once the set of model parameters are identified, the model 425 has been trained and can be tested or validated using the subset of testing data 445b (testing or validation data set). The testing or validation process includes iterative operations of inputting utterances from the subset of testing data 445b into the model 425 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data 445a may be input into the model 425 to obtain output (in this example, one or more recognized entities), and the output is evaluated versus ground truth entities using correlation techniques such as Bland-Altman method and the Spearman's rank correlation coefficients. Further, performance metrics in analysis results 452 may be calculated in entity recognition evaluation stage 415 such as the error, accuracy, precision, recall, receiver operating characteristic curve (ROC), etc. The metrics in the analysis results 452 may be used in the entity recognition evaluation stage 415 to analyze performance of the model 425 for recognizing entities.

The model training stage 410 outputs one or more trained models, such as entity recognition model 455. The entity recognition model 455 may be deployed and used in the prediction model training stage 410 and/or implementation stage 420 for implementing one or more chatbots. For example, the entity recognition model 455 may be used to generate named entities 465 in sets of training data, and the name entities together with labels 450 (e.g., intent labels) can be used for training other prediction models 425 such as intent prediction models. Alternatively, one or more chatbots may be configured with the trained entity recognition model 455 to receive utterances, for example text data 460, from one or more chatbot users and extract entities 465 of various utterances received from the one or more chatbot users. The entities 465 may be part of the extracted information (e.g., extracted information 205; 304 described respectively in FIGS. 2 and 3) obtained from the text data 460, and may be used in downstream processing such as intent classification.

Techniques for Entity-Aware Data Augmentation

For the purpose of this application, entity type may refer to a type of named entities or a category that name entities belong to, such as person, organization, and location. Entity value may refer to the individual named entity (a word or a phrase) within an entity type. For example, as discussed above about input utterances, "Give Peter a raise" and "Give James a raise," The words, Peter and James, are the entity values, and they are both under entity type "person." The source of entity type may include system entities generated by the cloud service provider and custom entities provided by customers.

There are different ways of performing entity-aware augmentation. It has been found that random entity value augmentation has better improvement in reducing entity sensitivity than augmentation with named entities in the training set. Instead of merely applying different entity values on input utterance and entity normalization, the novel random entity value augmentation techniques disclosed in the present disclosure may generate new sentences with named entities replaced with entity values randomly sampled through augmentation packages (e.g., faker python package) with various augmentation rates to achieve optimal performance. Additional balancing (e.g., hierarchical batch balancing and source balancing) may also be performed on the intent training data. Finally, random entity values can also be applied based on the entity types (e.g., person, organization, number, date, etc.). For example, random entity values involving certain entity types (e.g., person) may achieve better performance. All these techniques help contribute to better performance of random entity value augmentation. The following table illustrates the improvement comparisons between these two different approaches:

| Method | Augmentation count per utterance | Improvements | Regressions |
|---|---|---|---|
| Random Named | 10 | 232 | 23 |
| entity Augmentation | 15 | 290 | 23 |
| | 20 | 315 | 18 |
| Entity augmentations | 10 | 108 | 11 |
| with named entities | 15 | 159 | 7 |
| in training set | 20 | 197 | 8 |

In the above table, the Random Named Entity Augmentation approach has improvement numbers between 232~315, while Entity augmentations with named entities in training set approach has improvement numbers between 108~197. The numbers in the improvements column refer to the total number of utterances that the intent prediction model predicts correctly using a specific approach that is over a number of utterances that a baseline model (i.e., without entity-aware augmentation) correctly predicted. The numbers in the regressions column refer to total number of utterances that were predicted correctly in the baseline model but have become incorrect in the new model trained using the new approach. The above numbers are accumulated across test datasets. The proposed augmentation techniques described in this present disclosure provide good accuracy and have low inference time because they do not require much effort (e.g., no NER models required at inference time) during deployment. The training time may be longer, but the inference time should be the same.

In certain embodiments, data augmentation can enlarge datasets by using underlying data distribution to generate synthetic samples. The Entity-Aware Data augmentation techniques described in this present disclosure include positive and negative entity-aware data augmentations. Positive data augmentation creates in-domain samples, while negative data augmentation creates out-of-domain (or out-of-distribution—(OOD)) samples. The positive entity-aware augmentation technique addresses the stability of the model to entity value changes for intent prediction. Positive entity-aware data augmentation has two modes of operation, Diversify mode and Augment Diversify (AD) mode.

The diversify mode post-processes a subset of positive augmentations by performing an entity value replacement operation on positive augmented utterances from augmentation techniques such as Easy Data Augmentation ("EDA") and Noise augmentation, or a combination thereof, and does not introduce a separate extra bucket of training data. In certain embodiments, the replacement operation may include replacing at least one or more entity values of the named entities with random values of same entity type. In a non-limiting example of diversify mode, for an EDA augmented utterance "grant Peter a promotion," the word "Peter" may further be substituted with "Luke" to generate the utterance "grant Luke a promotion." In another example, for a Noise augmented utterance "Melbourne is a city; give Peter a raise on August 20", the words "Peter" and "August 20" may further be substituted with "Sara" and "next Friday" to generate the utterance "Melbourne is a city; give Sara a raise on next Friday." In other words, the diversify mode may be considered a two-stage augmentation technique, where the first stage comprises positive augmentation using techniques such as EDA and Noise, while the second stage comprises an additional replacement operation (i.e., post-processing) on the augmented data. The EDA and Noise techniques are described in more detail below.

In certain embodiments, EDA generates a positive utterance from an input utterance in the training data with one of the following operations: synonym replacement (i.e., randomly selecting n words from the sentence that are not stop words and replace each of these words with one of its synonyms); random insertion (i.e., find a random synonym of a random word in the sentence and insert a synonym into a random position in the sentence); random swap (i.e., randomly select two words in the utterance and swap their positions); and random deletion (i.e., randomly remove each word in the sentence with probability p). For example, for the input utterance "give Peter a raise," the word "give" can be substituted with the synonym "grant" to generate the utterance "grant Peter a raise." Also, for an input utterance "give Peter a raise on August 20," the words "August 20" may be removed to generate the utterance "give Peter a raise on."

Noise augmentation generates a positive utterance from an input utterance in the training data by adding one or more words to the input utterance (i.e., adding noisy in-domain context). For example, for the input utterance "give Peter a raise on August 20," the words "Melbourne is a city" can be added before "give Peter a raise on August 20" to generate the positive utterance "Melbourne is a city; give Peter a raise on August 20."

The Augment Diversify (AD) mode, on the other hand, includes two parts, positive EA augmentation and diversify mode augmentation. In certain embodiments, the Entity-Aware (EA) augmentation part performs a random entity value replacement operation on all detected named entities in an input utterance by randomly sampling entity values from an in-domain repository and introduces the generated utterance as an extra EA augmented training data (i.e., this mode introduces a separate extra bucket of training data). The diversify mode augmentation part, as discussed above, is also performed on existing augmented utterances from EDA, Noise, or a combination thereof. As a result, the AD mode may generate multiple augmented utterance training sets—one from EA augmentation, and another or others from post-processed EDA, and/or Noise augmentation. In some embodiments, the EA augmentation part and the first stage of the diversify mode (e.g., EDA, Noise, or a combination) may be performed in parallel, followed by the second stage of the diversify mode (i.e., post-processing the EDA and/or Noise augmented data).

Additionally, in certain embodiments, EA augmentation may include an augmentation rate configuration allowing to perform multiple operations of the EA technique. For example, when the augmentation rate of the AD mode is set to 2, for an input utterance "grant Peter a promotion", the configuration rate 2 may perform EA augmentation to generate two utterances, "grant James a raise," and "grant Sara a raise" in addition to the diversify mode's utterance "grant Luke a promotion" (discussed above in relation to the diversify mode that merely replaces Peter with Luke). The AD mode is a comprehensive application of the EA data augmentation approach. However, the choice of which mode to use may be a hyper-parameter, or controlled by or dependent on hyper-parameters that may be tuned. For example, when the training data is small, an additional diversify mode augmentation besides the EA augmentation may help. In some cases, the hyperparameter tuning may only need diversify mode. Since the EA augmentation techniques introduce more entity values to the training model, the training models can learn to treat entity values equally to address the entity value sensitivity issue. In other words, after the models are trained with the EA augmentations, the two input utterances, "give Peter a raise on August 20" and "give John a raise on September 4," should lead to the same output prediction.

The negative augmentation techniques address a second challenge where the machine learning model uses entity values as shortcuts for prediction. Hence, techniques described herein introduce the entity values in the training data as OOD data, so the training models can learn that these out-of-domain entity values are not linked to in-domain intents. Negative entity-aware data augmentation may include KAT plus entity without context, and KAT plus entity in random context as OOD. Negative data augmentation without entity aware may include KAT, SWAT and OOD, and can improve models' performance on out-of-domain tests and sensitivity to stop words.

Keyword Augmentation Technique ("KAT") is a negative augmentation technique, and may be with entity aware or without entity aware. KAT augmentation without entity aware samples utterances containing keywords that are present in the in-domain training data but in a different context from a corpus, and adds them as OOD. The goal of KAT is to minimize the pull of keywords present in the training data towards certain intents by using them in a different OOD context. For example, for a training utterance "What is a dynamic entity", KAT may identify the words, "dynamic" and "entity" as keywords and consequently augments the training set with the following negative utterances: "but the information on the dynamics of population was often quite misleading", and "does society really exist as an entity over and above the agglomeration of men?"

KAT plus entity without context augmentation generates entity values that appear in the training data as negative out-of-domain examples by removing in-domain context information around the named entities, so the training models may not pay attention to the particular entity values because they show up as out-of-domain examples besides the in-domain examples. For example, for the input utterance "give Peter a raise on August 20", the KAT plus entity without context augmentation generates a negative example by removing the context ("give" and "a raise on") surrounding the entity values, and the result utterance becomes "Peter August 20."

KAT plus entity in random context as OOD augmentation generates entity values that appeared in the training data in a random context as out-of-domain examples. In certain embodiments, the random context is sampled from an out-of-domain corpus. The out-of-domain corpus has tokens such as person names (i.e., person entity type), and the random context is then generated by replacing the entity values based on their entity types (e.g., a token in Person type is replaced with entity value "Peter"). Because the entity values do not have an association with the in-domain classes, this augmentation may help break the association to the in-domain intent classes. For example, for the input utterance "create $20 expense for my uber ride to the airport," the entity value "$20" may be put in a random context to generate the utterance "the minimum wage in some cities is $20."

In certain embodiments, the utterance examples that the KAT augmentations generate should be far away from the utterances of in-domain examples by ensuring that the distances of the embedding vectors for in-domain examples and out-of-domain examples are above a threshold value such that the training models do not observe both positive and negative data from the same intent to avoid confusing the training models. The embedding vectors are created by putting utterance examples through a language model. For example, given an input utterance where a KAT version is generated, the two utterances (i.e., in-domain example and out-of-domain example) are passed through a language model to generate embedding vectors. The distance between those two embedding vectors should be above a threshold value. The threshold may be a hyperparameter that can be adjusted to figure out the optimal distance.

SWAT generates an utterance by identifying all stop words and non-stop words in an input utterance in the training data, preserving the stop words in the input utterance, and replacing all non-stop words in the input utterance with random stop words. Stop words generally refer to those words in a phrase, sentence, and/or utterance that do not contribute to the meaning of the phrase, sentence, and/or utterance. However, in Natural Language Processing ("NLP") applications, stop words generally refer to those words in a phrase, sentence, and/or utterance that are filtered from an utterance so that named entity recognition and/or intent classification models focus on entity values and other contextual information in the utterance. A list of stop words can be provided by a user or customer and/or may be acquired by publicly available and well-known stop word lists for a given language. For example, for the input utterance "do you offer a one day trial membership," the utterance "do you to a one say a likely" is generated by removing the non-stop words "offer," "day," "trial," and "membership" and inserting the stop words "to," "say," "a," and "likely." In this way, the stop word pattern in the input utterance is preserved. By replacing all non-stop words with a stop word, the meaning and intent class of the stop word augmented utterance are different from meaning and intent class of the input utterance.

OOD augmentation is a negative augmentation technique but not entity aware (i.e., no entity value replacement is performed on OOD bucket), and it identifies one or more utterances that are not in-domain (i.e., related to a specific domain or particular task) and treats those one or more utterances as negative utterances. For example, utterances may correspond to one or more different domains. In some cases, utterances in one domain may be treated as negative utterances. In some cases, utterances in two or more domains may be treated as negative utterances. The foregoing examples are not intended to be limiting. Users or customers may select the one or more domains. Alternatively, or in addition, the one or more domains may be selected automatically depending on the specific task or domain of the chatbot or intent classifiers. Accordingly, utterances that are not in-domain (i.e., not in one or more desired domains) are treated as negative utterances. For example, for selected domain food ordering, anchor utterances in the training corpus not in the food ordering domain may be treated as negative utterances. Utterance in the training corpus may be labeled with one or more domains. Accordingly, these labels may be referenced when determining the one or more domains of the utterances. Alternatively, or in addition, the one or more domains may be determined using domain recognition models and/or other models known in the art.

Figure 5:
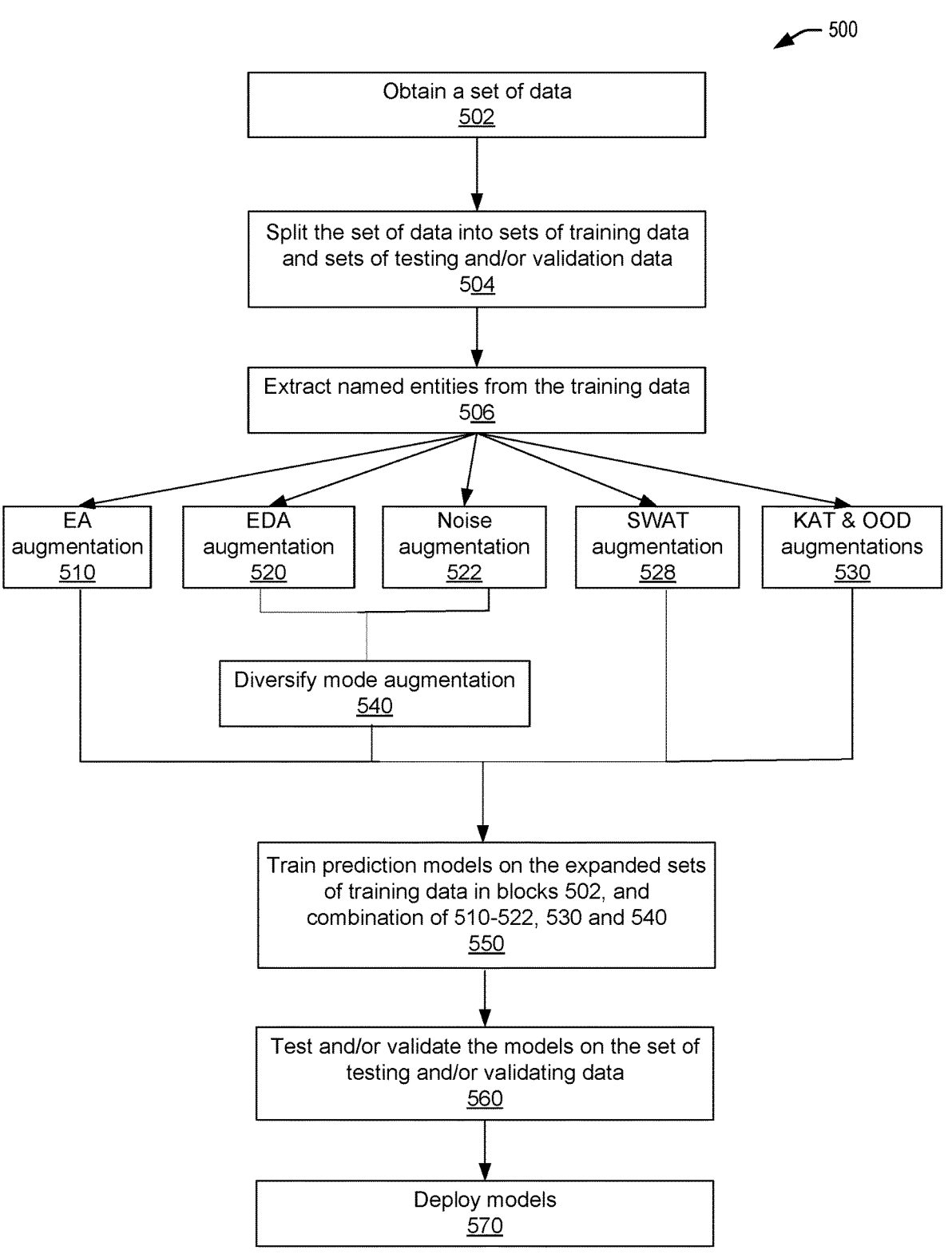
FIG. 5 is a simplified flowchart illustrating a process for overall tuning of a predictive model with entity-aware data augmentation.

FIG. 5 is a simplified flowchart illustrating a process for overall tuning of a predictive model with entity-aware data augmentation. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4, the processing depicted in FIG. 5 may be performed by a pre-processing subsystem (e.g., pre-processing subsystem 210 or prediction model training stage 410).

At step 502, a set of data comprising utterances is obtained by a data processing system, (e.g., the chatbot system 400 described with respect to FIG. 4) for training an intent prediction model. At step 504, the set of data is split into a set of training data and a set of testing and/or validation data (evaluation data set as a goal for one or more predictive models). The training data comprises utterances and intent labels. At step 506, named entities within the set of training data are extracted based on the entity types supported by the NER model for preparation of data augmentation. Depending on the types and modes of data augmentation to be applied by considering the need of hyperparameters of the models, the process may use one or more or a combination of several augmentation techniques and proceed in different flows to be discussed below.

For positive augmentation only, either one or more of the steps, EA 510, EDA 520 and Noise 522, may be applied to generate augmented training data (or utterances). At step 550, a predictive model (e.g., an intent prediction model) is trained on the expanded set of training data in block 502 and the augmented training data generated by these steps (i.e., one or more of 510, 520 and 522) to learn parameters for recognizing and classifying entities within utterances. These steps may be performed in parallel or certain desired order.

For positive augmentation diversify mode only, the process goes to step EDA 520 or step Noise 522 or both, and then diversify mode augmentation step 540 to generate augmented training data (or utterances). At step 550, a predictive model is trained on the expanded set of training data in block 502 and the augmented training data by these steps (i.e., 520 & 540, and/or 522 & 540) to learn parameters for classifying intents expressed in utterances. As discussed above about the diversify mode, the result of step 540 is a post-processed result of EDA augmentation or Noise augmentation, and not a new training data.

For positive augmentation AD mode, the step EA 510, and the above diversify mode steps (i.e., 520 & 540, and/or 522 & 540) are applied to generate augmented training data (or utterances). In certain embodiments, the step EA 510 and the first stage of diversify mode (520 and/or 522) may be performed in parallel and at the same time, then followed by step 540. At step 550, a predictive model is trained on the expanded set of training data in block 502 and the augmented training data by the EA augmentation and diversify mode augmentation (e.g., post-processed EDA and/or post-processed Noise) to learn parameters for classifying intents expressed in utterances.

For negative augmentation, either one or more of the steps, SWAT 528 and KAT related augmentations 530, may be applied to generate augmented training data (or utterances). The step 530 may include KAT, KAT plus entity without context, KAT plus entity in random context as OOD, and OOD augmentation. One or more of these augmentation techniques may be applied either in parallel or in a certain sequence to generate augmented training data (or utterances). At step 550, a predictive model is trained on the expanded set of training data in block 502 and the augmented training data by step 528 and/or step 530.

The steps of positive augmentation and negative augmentation, such as 510-530 may be performed in parallel, but the step 540, as a post-processing step, should be performed after the EDA step 520 and the Noise step 522 have been performed.

At 560, the one or more predictive models are tested and/or validated on the one or more sets of testing and/or validation data for intent classification. The testing and/or validation is performed and analyzed to obtain a revised evaluation of the one or more predictive models and, if any, obtain an understanding of additional information (e.g., additional nouns or text formats) needed to add into the one or more sets of training data to improve performance of the one or more predictive models for classifying intents expressed in utterances in various languages and/or text formats.

Thereafter, based on the evaluation of the training and testing of the one or more predictive models, steps 510-560 may be iteratively repeated until the evaluation demonstrates optimal performance of the one or more predictive models for classifying intents expressed in utterances in various languages and/or text formats. Once the one or more predictive models are trained and/or achieved optimal performance as determined by the various tools. At step 570, the trained prediction model may be deployed within a chatbot system (e.g., as part of a skill bot) for classifying intents expressed in utterances in various languages and/or text formats. For example, an utterance may be received, the utterance may be analyzed by the one or more predictive models to determine whether the utterance belongs to one of the intents.

Illustrative Systems

Figure 6:
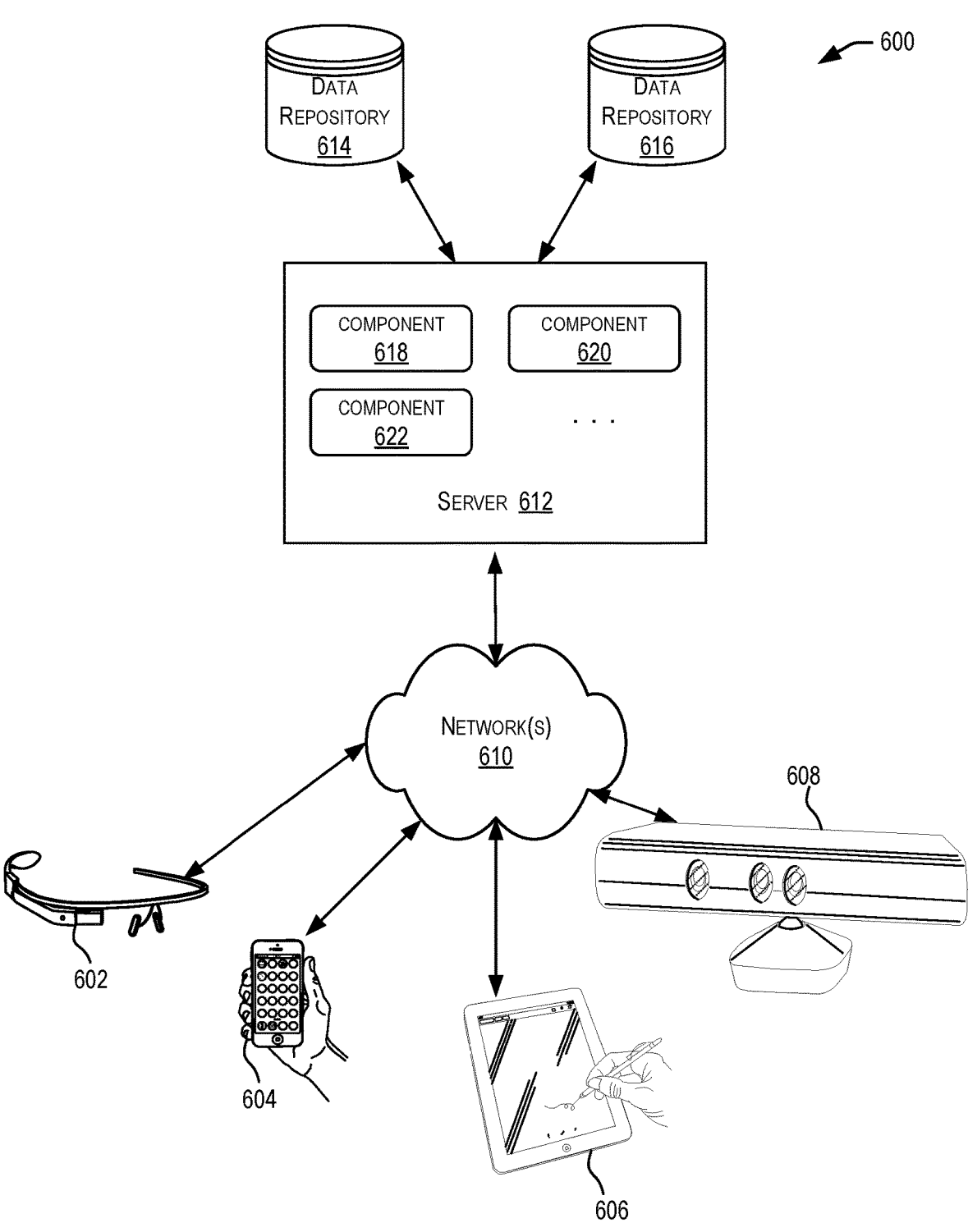
FIG. 6 depicts a simplified diagram of a distributed system for implementing various embodiments.

FIG. 6 depicts a simplified diagram of a distributed system 600. In the illustrated example, distributed system 600 includes one or more client computing devices 602, 604, 606, and 608, coupled to a server 612 via one or more communication networks 610. Clients computing devices 602, 604, 606, and 608 may be configured to execute one or more applications.

In various examples, server 612 may be adapted to run one or more services or software applications that enable one or more embodiments described in this disclosure. In certain examples, server 612 may also provide other services or software applications that may include non-virtual and virtual environments. In some examples, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The example shown in FIG. 6 is thus one example of a distributed system for implementing an example system and is not intended to be limiting.

Users may use client computing devices 602, 604, 606, and/or 608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 may include one or more virtual machines running virtual operating systems, or other computing architectures involving virtualization such as one or more flexible pools of logical storage devices that may be virtualized to maintain virtual storage devices for the server. In various examples, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain examples. For example, one or more of the data repositories 614, 616 may be used to store information such as information related to chatbot performance or generated models for use by chatbots used by server 612 when performing various functions in accordance with various embodiments. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain examples, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 614, 616 may also be used by applications to store application data. The data repositories used by applications may be of different types such as, for example, a key-value store repository, an object store repository, or a general storage repository supported by a file system.

Figure 7:
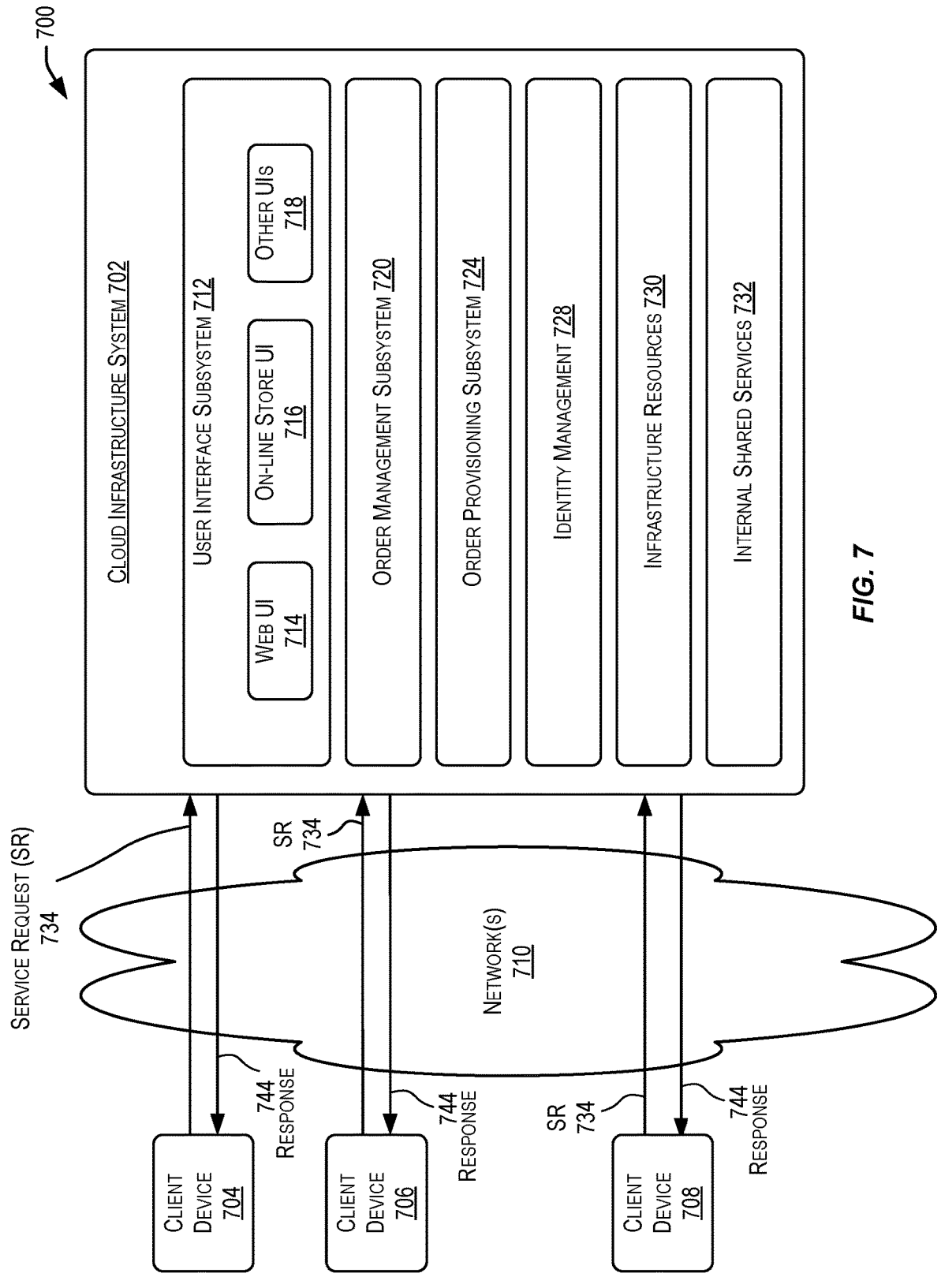
FIG. 7 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 7 is a simplified block diagram of a cloud-based system environment in which various services may be offered as cloud services in accordance with certain examples. In the example depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general-purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in some other examples, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative examples.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer may be an individual or an enterprise. In certain other examples, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request information or action from a chatbot as described in this disclosure.

In some examples, the processing performed by cloud infrastructure system 702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like. In certain examples, the storage virtual machines that are available for servicing storage requested from applications may be part of cloud infrastructure system 702. In other examples, the storage virtual machines may be part of different systems.

In certain examples, to facilitate efficient provisioning of these resources for supporting the various cloud services provided by cloud infrastructure system 702 for different customers, the resources may be bundled into sets of resources or resource services (also referred to as "pods"). Each resource service or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a service offered by cloud infrastructure system 702. As part of the order, the customer may provide information identifying a chatbot system for which the service is to be provided and optionally one or more credentials for the chatbot system.

In certain examples, such as the example depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 702 as part of the provisioning process. Cloud infrastructure system 702 may generate an application ID and select a storage virtual machine for an application from among storage virtual machines provided by cloud infrastructure system 702 itself or from storage virtual machines provided by other systems other than cloud infrastructure system 702.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 702 and information identifying a chatbot system selected by cloud infrastructure system 702 for the chatbot system corresponding to the chatbot system ID.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain examples, cloud infrastructure system 702 comprises an identity management subsystem (IMS) 728 that is configured to manage customer information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
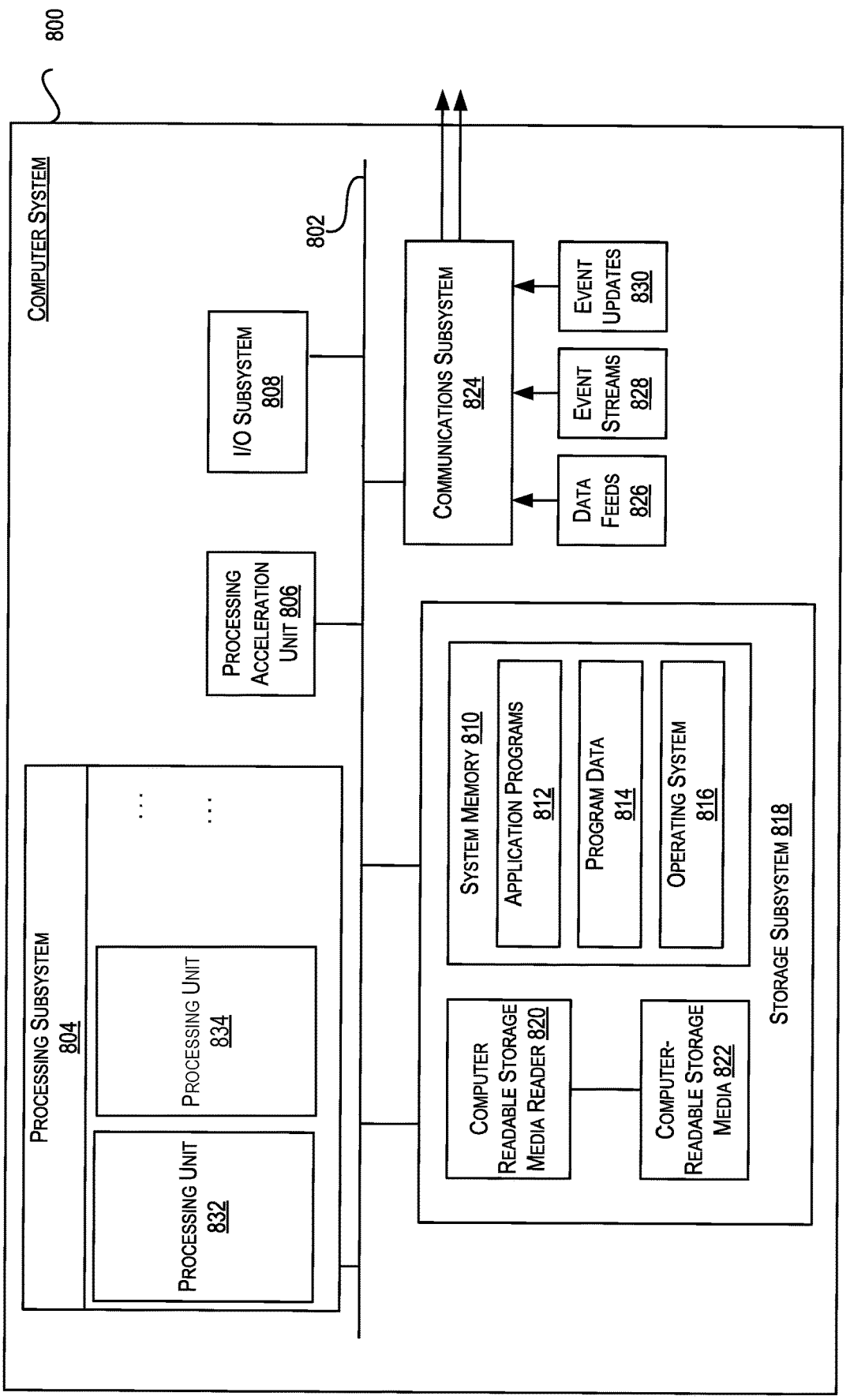
FIG. 8 illustrates an example computer system that may be used to implement various embodiments.

FIG. 8 illustrates an example of computer system 800. In some examples, computer system 800 may be used to implement any of the digital assistant or chatbot systems within a distributed environment, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative examples of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 may be organized into one or more processing units 832, 834, etc. A processing unit may include one or more processors, one or more cores from the same or different processors, a combination of cores and processors, or other combinations of cores and processors. In some examples, processing subsystem 804 may include one or more special purpose co-processors such as graphics processors, digital signal processors (DSPs), or the like. In some examples, some or all of the processing units of processing subsystem 804 may be implemented using customized circuits, such as application specific integrated circuits (ASICs), or field programmable gate arrays (FPGAs).

In some examples, the processing units in processing subsystem 804 may execute instructions stored in system memory 810 or on computer readable storage media 822. In various examples, the processing units may execute a variety of programs or code instructions and may maintain multiple concurrently executing programs or processes. At any given time, some or all of the program code to be executed may be resident in system memory 810 and/or on computer-readable storage media 822 including potentially on one or more storage devices. Through suitable programming, processing subsystem 804 may provide various functionalities described above. In instances where computer system 800 is executing one or more virtual machines, one or more processing units may be allocated to each virtual machine.

In certain examples, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some examples. Storage subsystem 818 may store software (e.g., programs, code services, instructions) that when executed by processing subsystem 804 provides the functionality described above. The software may be executed by one or more processing units of processing subsystem 804. Storage subsystem 818 may also provide authentication in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program services that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some examples. Computer-readable media 822 may provide storage of computer-readable instructions, data structures, program services, and other data for computer system 800. Software (programs, code services, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs.

In certain examples, storage subsystem 818 may also include a computer-readable storage media reader 820 that may further be connected to computer-readable storage media 822. Reader 820 may receive and be configured to read data from a memory device such as a disk, a flash drive, etc.

In certain examples, computer system 800 may support virtualization technologies, including but not limited to virtualization of processing and memory resources. For example, computer system 800 may provide support for executing one or more virtual machines. In certain examples, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, when computer system 800 is used to implement bot system 120 depicted in FIG. 1, the communication subsystem may be used to communicate with a chatbot system selected for an application.

Communication subsystem 824 may support both wired and/or wireless communication protocols. In certain examples, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some examples, communications subsystem 824 may provide wired network connectivity (e.g., Ethernet) in addition to or instead of a wireless interface.

Communication subsystem 824 may receive and transmit data in various forms. In some examples, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or services are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:

accessing a first set of training data, the first set of training data comprising anchor utterances;

extracting named entities from the anchor utterances of the first set of training data using a trained named entity recognition ("NER") model;

generating a second set of training data by applying multiple positive data augmentation techniques to modify the named entities extracted from the first set of training data, wherein the multiple positive data augmentation techniques comprise i) an Entity Aware ("EA") technique that generates a first positive augmented utterance training set and ii) a two-stage augmentation technique that generates a second positive augmented utterance training set, wherein the EA technique is performed in parallel with a first stage of the two-stage augmentation technique, and wherein the second set of training data includes the first positive augmented utterance training set and the second positive augmented utterance training set;

combining the first set of training data and the second set of training data to generate expanded training data;

training a machine learning model using the expanded training data to result in a trained machine learning model associated with a digital assistant system;

deploying the trained machine learning model;

generating, based on an input utterance and by the trained machine learning model, a confidence score indicating a likelihood that the input utterance is associated with capability of the digital assistant system; and based on the confidence score, performing a task based on the capability.

2. The method of claim 1, wherein the EA technique comprises replacing at least one or more entity values of the named entities within the first set of training data with random values sampled from an in-domain repository.

3. The method of claim 2, further comprising an augmentation rate configured to perform multiple operations of the EA technique.

4. The method of claim 1, wherein the two-stage augmentation technique comprises the first stage of the two-stage augmentation technique and a second stage of the two-stage augmentation technique, and the second stage of the two-stage augmentation technique is performed subsequent to the first stage of the two-stage augmentation technique and the EA technique.

5. The method of claim 4, wherein the second stage of the two-stage augmentation technique comprises replacing at least one or more entity values of the named entities within a result of the first stage of the two-stage augmentation technique with random values of same entity type.

6. The method of claim 1, wherein the first stage of the two-stage augmentation technique comprises:

randomly replacing a portion of the first set of training data with synonyms; or randomly deleting one or more named entities within the first set of training data.

7. The method of claim 1, wherein the first stage of the two-stage augmentation technique comprises:

randomly inserting a synonym in a random position in the first set of training data; or randomly swapping positions of two named entities within the first set of training data.

8. The method of claim 1, wherein the first stage of the two-stage augmentation technique comprises randomly adding in-domain context around entity values within the first set of training data.

9. A non-transitory computer-readable medium storing computer-executable instructions that, when executed by one or more processors, configure the one or more processors to perform operations comprising:

accessing a first set of training data, the first set of training data comprising anchor utterances;

extracting named entities from the anchor utterances of the first set of training data using a trained named entity recognition ("NER") model;

generating a second set of training data by applying multiple positive data augmentation techniques to modify the named entities extracted from the first set of training data;

wherein the multiple positive data augmentation techniques comprise i) an Entity-Aware ("EA") technique that generates a first positive augmented utterance training set and ii) a two-stage augmentation technique that generates a second positive augmented utterance training set, wherein the EA technique is performed in parallel with a first stage of the two-stage augmentation technique, wherein the second set of training data includes the first positive augmented utterance training set and the second positive augmented utterance training set;

combining the first set of training data and the second set of training data to generate expanded training data;

training a machine learning model using the expanded training data to result in a trained machine learning model associated with a digital assistant system;

deploying the trained machine learning model;

generating, based on an input utterance and by the trained machine learning model, a confidence score indicating a likelihood that the input utterance is associated with a capability of the digital assistant system; and based on the confidence score, performing a task based on the capability.

10. The non-transitory computer-readable medium of claim 9, wherein the EA technique comprises replacing at least one or more entity values of the named entities within the first set of training data with random values sampled from an in-domain repository.

11. The non-transitory computer-readable medium of claim 10, further comprising an augmentation rate configured to perform multiple operations of the EA technique.

12. The non-transitory computer-readable medium of claim 9, wherein the two-stage augmentation technique comprises the first stage of the two-stage augmentation technique and a second stage of the two-stage augmentation technique, and the first-stage second stage of the two-stage augmentation technique is performed subsequent to the first stage of the two-stage augmentation technique and the EA technique.

13. The non-transitory computer-readable medium of claim 12, wherein the second stage of the two-stage augmentation technique comprises replacing at least one or more entity values of the named entities within a result of the first stage of the two-stage augmentation technique with random values of a same entity type.

14. The non-transitory computer-readable medium of claim 9, wherein the first stage of the two-stage augmentation technique comprises:

randomly replacing a portion of the first set of training data with synonyms;

randomly deleting one or more named entities within the first set of training data;

randomly inserting a synonym in a random position in the first set of training data;

randomly swapping positions of two named entities within the first set of training data, or;

randomly adding in-domain context around entity values within the first set of training data.

15. A system, comprising:

one or more processors; and one or more non-transitory computer readable media storing computer-executable instructions that, when executed by the one or more processors, cause configure the system to perform:

accessing a first set of training data, the first set of training data comprising anchor utterances;

extracting named entities from the anchor utterances of the first set of training data using a trained named entity recognition ("NER") model;

generating a second set of training data applying multiple positive data augmentation techniques to modify the named entities extracted from the first set of training data;

wherein the multiple positive data augmentation techniques comprise i) an Entity-Aware ("EA") technique that generates a first positive augmented utterance training set and ii) a two-stage augmentation technique that generates a second positive augmented utterance training set, wherein the EA technique is performed in parallel with a first stage of the two-stage augmentation technique, wherein the second set of training data includes the first positive augmented utterance training set and the second positive augmented utterance training set;

combining the first set of training data and the second set of training data to generate expanded training data;

training a machine learning model using the expanded training data to result in a trained intent prediction machine learning model associated with a digital assistant system;

deploying the trained machine learning model;

generating, based on an input utterance and by the trained machine learning model, a confidence score indicating a likelihood that the input utterance is associated with a capability of the digital assistant system; and based on the confidence score, performing a task based on the capability.

16. The system of claim 15, wherein the EA technique comprises replacing at least one or more entity values of the named entities within the first set of training data with random values sampled from an in-domain repository.

17. The system of claim 16, further comprising an augmentation rate configured to perform multiple operations of the EA technique.

18. The system of claim 15, wherein the two-stage augmentation technique comprises the first stage of the two-stage augmentation technique and a second stage second stage of the two-stage augmentation technique, and the first-second stage of the two-stage augmentation technique is performed subsequent to the first stage of the two-stage augmentation technique and the EA technique.

19. The system of claim 18, wherein the second stage of the two-stage augmentation technique comprises replacing at least one or more entity values of the named entities within a result of the first stage of the two-stage augmentation technique with random values of a same entity type.

20. The system of claim 15, wherein the first stage of the two-stage augmentation technique comprises:

randomly replacing a portion of the first set of training data with synonyms;

randomly deleting one or more named entities within the first set of training data;

randomly inserting a synonym in a random position in the first set of training data;

randomly swapping positions of two named entities within the first set of training data, or;

randomly adding in-domain context around entity values within the first set of training data.

* * * * *